(12) United States Patent
Campbell

(10) Patent No.: US 8,464,228 B2
(45) Date of Patent: Jun. 11, 2013

(54) BINARY LIBRARY

(75) Inventor: Craig Campbell, Layton, UT (US)

(73) Assignee: Accenture Global Services Limited, Dublin (IE)

( * ) Notice: Subject to any disclaimer, the term of this patent is extended or adjusted under 35 U.S.C. 154(b) by 995 days.

(21) Appl. No.: 11/844,143

(22) Filed: Aug. 23, 2007

(65) Prior Publication Data

US 2009/0055809 A1    Feb. 26, 2009

(51) Int. Cl.
*G06F 9/44*    (2006.01)

(52) U.S. Cl.
USPC ........... 717/140; 717/148; 717/150; 717/170; 717/171

(58) Field of Classification Search
None
See application file for complete search history.

(56) References Cited

U.S. PATENT DOCUMENTS

| | | | |
|---|---|---|---|
| 5,956,513 A | 9/1999 | McLain | |
| 6,202,207 B1 * | 3/2001 | Donohue | 717/173 |
| 6,810,519 B1 | 10/2004 | Hicks | |
| 7,155,462 B1 * | 12/2006 | Singh et al. | 717/170 |
| 2002/0144255 A1 | 10/2002 | Anderson | |
| 2007/0006176 A1 * | 1/2007 | Spil et al. | 717/135 |
| 2007/0283323 A1 | 12/2007 | Boden et al. | |

FOREIGN PATENT DOCUMENTS

WO    WO2004027607 A2    4/2004

OTHER PUBLICATIONS

Apache Maven Project home page, downloaded from http://maven.apache.org/maven-1.x/about/whatismaven.html on Aug. 23, 2007, 2 pages.
Examiner's First Report for Application No. 2008288798 dated Oct. 6, 2011, 2 pages.
Extended European Search Report for Application No. 08798559.4 mailed Dec. 10, 2012, 9 pages.

* cited by examiner

*Primary Examiner* — Chuck Kendall
(74) *Attorney, Agent, or Firm* — Fish & Richardson P.C.

(57) ABSTRACT

The subject matter of this specification can be embodied in, among other things, a process that includes receiving, during a computer programming process for a software program, a specification of a software module having a defined functionality for use by the software program. The software module is stored in a central repository having different versions of the software module. The process also includes compiling the software program. The compilation initiates steps including filtering versions of the software module that do not meet the specification. The specification corresponds to more than one version of the software module. The steps also include selecting, from versions that have not been filtered out, a version of the software module. The selection is based on one or more predetermined rules. The process also includes returning the selected version of the software module for local storage with the software program.

25 Claims, 10 Drawing Sheets

| | Software Module Name | Location | Major Revision (M) | Minor Revision (m) | Patch (P) | Build (B) | Stability Indicator | Time Stamp | Size | Culture | Public Key | Other Metadata |
|---|---|---|---|---|---|---|---|---|---|---|---|---|
| 430a | Socket Library | D:/SocketLibrary/ 2_1_0_2 | 2 | 1 | 0 | 2 | Pending | 2006122 9_2103 | 742kb | US | A2E | - |
| 430b | Socket Library | D:/SocketLibrary/ 2_1_0_1 | 2 | 1 | 0 | 1 | Stable | 2005031 6_1405 | 735kb | US | A2E | - |
| 430c | Socket Library | D:/SocketLibrary/ 3_4_1_5 | 3 | 4 | 1 | 5 | Rejected | 2007040 4_1523 | 853kb | US | A2E | Failing Test E |
| 430d | Socket Library | D:/SocketLibrary/ 3_3_6_2 | 3 | 3 | 6 | 2 | Pending | 2007072 3_1802 | 825kb | DE | QDE | - |
| 440a | Socket Test Data | D:/SocketTest/ 3_4_1_5 | 3 | 4 | 1 | 5 | NA | 2007040 4_1523 | 1kb | US | A2E | - |
| 440b | Socket Test Data | D:/SocketTest/ 3_3_6_2 | 3 | 3 | 6 | 2 | NA | 2007072 3_1802 | 1kb | DE | QDE | - |
| 440c | Socket Test Data | D:/SocketTest/ 3_3_6_2 | 3 | 3 | 6 | 2 | NA | 2007072 3_1802 | 1kb | US | QDE | - |
| 450a | Cursor Wait Image | D:/CursorImage/ 1_1_1_1 | 1 | 1 | 1 | 1 | NA | 2001010 2_1030 | 2kb | * | CWI | - |
| 450b | Cursor Wait Image | F:/CursorImage/ 2_1_1_1 | 2 | 1 | 1 | 1 | NA | 2006010 1_1943 | 2kb | * | CWI | - |
| | ⋮ | ⋮ | ⋮ | ⋮ | ⋮ | ⋮ | ⋮ | ⋮ | ⋮ | ⋮ | ⋮ | ⋮ |

FIG. 4

BINARY LIBRARY

TECHNICAL FIELD

This instant specification relates to programming and compiling software projects.

BACKGROUND

Software applications may depend on external executable code for their proper functioning. For example, some applications use dynamic linked libraries (DLLs) to perform common functions. During programming of an application, a user includes specific references to external resources in the application's source code. After compilation of the application, the application uses these references to access the external resources when needed.

SUMMARY

In general, this document describes methods and systems for programming and compiling software projects so that dependencies references by a software project are automatically retrieved.

In a first general aspect, a process of programming and compiling computer-executable code is described. The process includes receiving, during a computer programming process for a software program, a specification of a software module having a defined functionality for use by the software program. The software module is stored in a central repository having different versions of the software module. The process also includes compiling the software program. The compilation initiates steps including filtering versions of the software module that do not meet the specification. The specification corresponds to more than one version of the software module. The steps also include selecting, from versions that have not been filtered out, a version of the software module. The selection is based on one or more predetermined rules. The process also includes returning the selected version of the software module for local storage with the software program.

In a second general aspect, a computer-implemented process of returning, during a compilation process, a shared artifact for use by a software program is described. The process includes receiving a request for a shared artifact for use by a software program. The request includes one or more parameters that partially specify the requested shared artifact. The process also includes accessing a central repository that stores different versions of the requested shared artifact that are available for use and selecting a version of the shared artifact. The selection includes excluding versions of the shared artifact that do not meet the partial specification provided by the one or more parameters and selecting, from versions of the shared artifact that have not been excluded, the version of the shared artifact based on one or more predetermined rules. The process also includes outputting the selected version of the shared artifact for local storage with the software program.

The systems and techniques described here may provide one or more of the following advantages. First, the systems and methods permit a latest version of a referenced resource to be incorporated into a software project during compilation. Second, a mask can be used to ensure compatibility with some revisions, while allowing the selection of the most recent versions of other revisions. Third, a central repository can be used to permit resources to be conveniently shared among multiple software developers. Fourth, a plug-in to a standard development environment may be used to manage dynamic fetching of referenced resources.

The details of one or more embodiments of the described features are set forth in the accompanying drawings and the description below. Other features and advantages be apparent from the description and drawings, and from the claims.

DESCRIPTION OF DRAWINGS

FIG. 4 is a schematic diagram illustrating an example index used to identify software modules.

Like reference symbols in the various drawings indicate like elements.

DETAILED DESCRIPTION

This document describes systems and techniques for compiling software application using a central repository. In an example software development system, a computer system can use various software modules, such as executable code (e.g., code libraries), images, and/or data, to build or test a software project. In one implementation, the computer system can retrieve software modules from the central repository. For example, in response to a query, the central repository can return the required software modules. In some examples, the central repository can return a most recent version of the requested software modules to the computer system.

Figure 1:
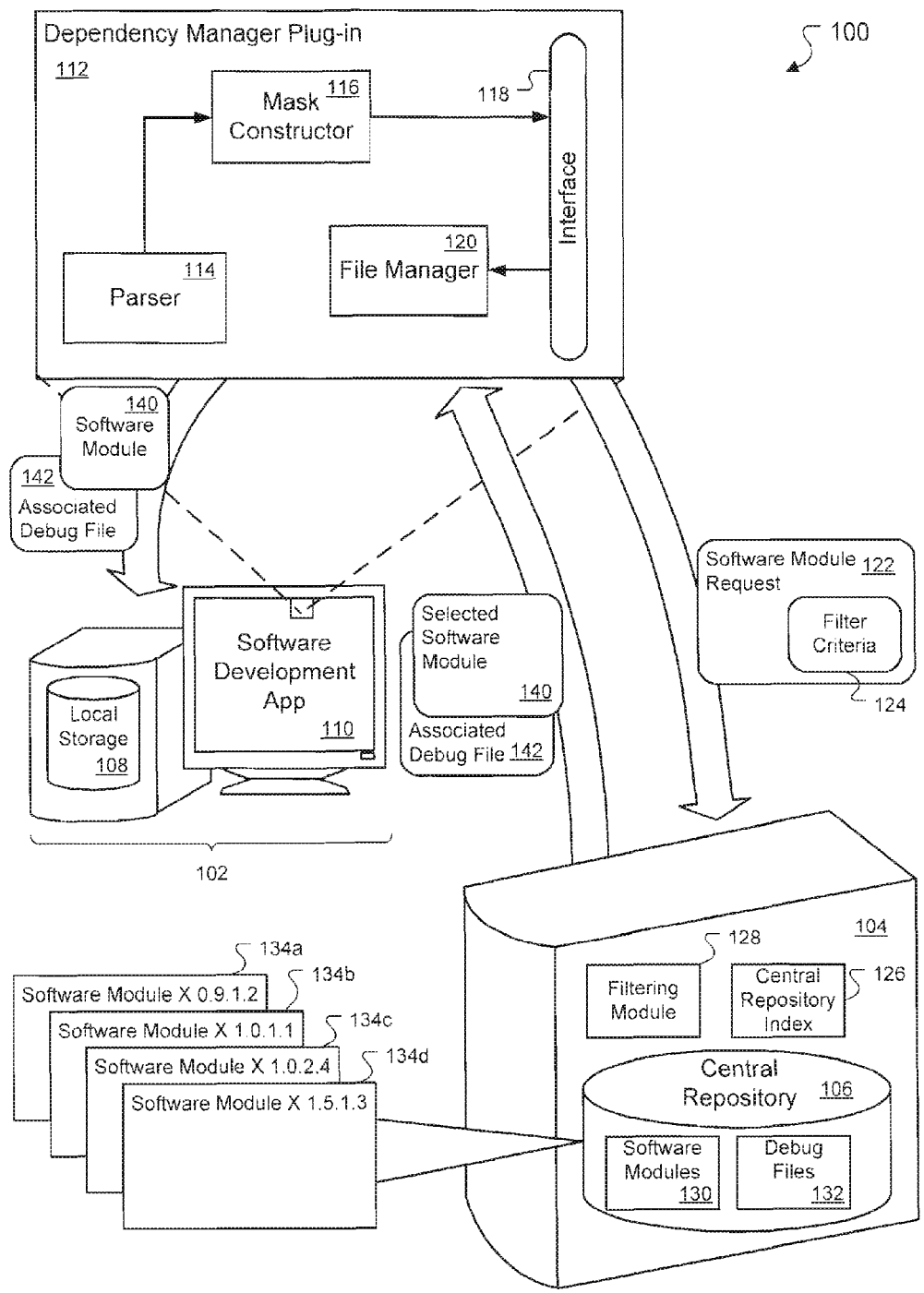
FIG. 1 is a block diagram illustrating an example system for programming and compiling computer executable code.

FIG. 1 is a block diagram illustrating an example software development system 100 for programming and compiling computer executable code. The software development system 100 includes a computer system 102 and a remote server 104. The remote server 104 includes a central repository 106. In some examples, the computer system 102 can retrieve various software modules from the central repository 106 to develop a software project. In some implementations, the central repository 106 can return a most recent version of the required software modules to the computer system 102.

As shown in FIG. 1, the computer system 102 includes a local storage 108 and a software development application 110. For example, the local storage 108 can be a magnetic storage device (e.g., a hard disk drive), a semiconductor storage device (e.g., a flash memory), an optical disc storage device (e.g., DVD-RW), or a combination thereof. In some implementations, data stored in the local storage 108 can be organized in a file system. For example, directories and subdirectories can be created in the local storage 108, and the data can be stored within the directories and/or the subdirectories.

The software development application 110 can be used to create software projects. For example, a user can use the software development application 110 to design, code, debug, compile, and/or build software projects. In some implementations, the software development application 110 includes a build platform (e.g., MSBuild of Microsoft Corporation of Redmond, Wash.) to compile and build software projects developed using the software development application 110.

In one implementation, the software development application 110 can build software projects based on a user specified code. For example, the user specified code (e.g., an extensible markup language (XML) syntax, shell script, or other project building utility syntax) can include compilation instructions for the software projects. The code also can reference software modules (e.g., source code files, software library, assemblies, and/or other data or media) to be included in the build.

In certain implementations, the software development application 110 includes a dependency manager plug-in 112. For example, the dependency manager plug-in 112 can be installed in the software development application 110 to retrieve software modules referenced by source code for a software application being developed. For example, the dependency manager plug-in 112 can process the source code to identify the referenced software modules, and can determine which of the referenced software modules are to be fetched from the remote server 104. For example, if a referenced software module is not stored locally or is older than a version stored in the central repository 106, then the dependency manager plug-in 112 can access the remote server 104 and retrieve the referenced software modules to the computer system 102.

The dependency manager plug-in 112 includes a parser 114, a mask constructor 116, an interface 118, and a file manager 120. In some implementations, the parser 114 can, upon compilation, parse the source code to determine referenced software modules used in a software project. For example, if the source code is formatted in XML, then the parser 114 can parse the XML code to identify XML tags associated with references that specify the dependent software modules that the application being compiled uses. For example, the XML tags can include names, version information, and/or other metadata associated with the referenced software modules.

In some implementations, the mask constructor 116 uses the parsed source code from the parser 114 to generate one or more identifiers to request target the referenced software modules. For example, each of the identifiers can include a name of the referenced software module and a mask, which is used to fully or partially specify a version of the software module. In one implementation, the mask constructor 116 can generate a mask, which is used to retrieve a latest version of a software module. For example, a mask generated by the mask constructor 116 can specify a version corresponding to a particular major revision of the referenced software module while leaving the specific minor revision unspecified (e.g., a version compatible with the major revision "1.x" is specified, but a particular minor revision is not specified so that both versions "1.1" and "1.5" are acceptable). Because the minor version is unspecified, the most recent minor version (e.g., 1.5 in the example above) can be retrieved from the central repository 106, as explained more fully below. Exemplary formats for masks are described with reference to FIGS. 3A-3C.

Using the interface 118, the dependency manager plug-in 112 can transmit a software module request 122 to the remote server 104. In one example, the interface 118 can generate the software module request 122 using the identifier output from the mask constructor 116. In the depicted example, the software module request 122 includes filter criteria 124. For example, the filter criteria 124 can include a set of filtering requirements related to the metadata of the required software modules.

The remote server 104 includes a central repository index 126 and a filtering module 128. In certain implementations, the remote server 104 can use the central repository index 126 and the filter module 128 to filter and select the referenced software module based on the received software module request 122.

As shown in FIG. 1, the central repository 106 can include software modules 130 and debug files 132. For example, the central repository 106 can include multiple versions of a software module. In the depicted example, the central repository 106 stores four versions 134a, 134b, 134c, 134d of a software module X. In some implementations, the versions 134a-d can be published to the central repository 106 by the computer system 102 or by other computer systems (not shown). The debug files 132, in some implementations, are used by the software development application 110 in debugging errors associated with a software. The debug files can be used as a proxy for the source code for debugging errors that occur in association with software modules that include only binary code (e.g., no source code).

In some implementations, the central repository index 126 can include a lookup file or a catalog that stores information, such as a directory path that include a software module's identifier, version information, time stamps (e.g., when a software module is posted to the central repository), status indicators (e.g., stable, rejected, or pending), or other metadata related to the software modules 130. One example of the central repository index 126 is described with reference to FIG. 4.

In some implementations, the remote server 104 can use the central repository index 126 and filter criteria 124 to filter versions of software modules 130 stored in the central repository 106. In one example, the remote server 104 can compare a software module name included in the filter criteria 124 with the software module names in the central repository index 126 to select versions of the software modules 130. For example, the remote server 104 may receive a request for a software module named "Game Engine." The remote server 104 can access the central repository index 126 to select, for example, all versions of a software module that has the name "Game Engine."

As described above, the selected software module having a name that matches the name in the request 122 may have several versions. The remote server 104 can use the filter criteria to eliminate some of the several versions from further consideration. For example, the filtering criteria 122 can specify a major revision but leave the minor, patch, and build information unspecified. The remote server 104 can remove from consideration all versions that do not match the specified major revision.

FIG. 1 shows an example of a process in which the remote server 104 selects a single version to return based on the filter criteria 124. In this example, the filter criteria 124 specifies "software module X" as the name of a requested software module and specifies "1.0.x.x." as a mask for the requested version. In this implementation, the mask has the following format—Major.minor.Patch.Build (MmPB), where "Major" indicates a major revision, "minor" indicates a minor revision, "Patch" indicates a revision to repair a bug or deficiency, and "Build" indicates a particular compilation of the software module.

As shown in FIG. 1, four versions of the software module X are stored in the central repository 106, a version "0.9.1.2" 134a, a version "1.0.1.1" 34b, a version "1.0.2.4" 134c, and a version "1.5.1.3" 134d. By matching the mask to the software modules version numbers 134a-d, the filtering module 128 can filter out software modules with the version numbers "0.9.1.2" 134a and "1.5.1.3" 134d because the major.minor version of the versions 0.9.1.2 134a and 1.5.1.3 134d does not match the specified major.minor version "1.0."

In certain implementations, the remote server 104 selects a version to return from the remaining versions 134b-c according to one or more predetermined rules. For example, the remote server 104 can select the version 1.0.2.4 134c because the version 1.0.2.4 134c is newer than the version 1.0.1.1 134b as indicated by a higher patch value "2" (as opposed to the patch value "1" for the version 1.0.1.1 134b.

In another example, the remote server 104 can receive filter criteria 132 that include a name of the referenced software module without specifying any particular version. For instance, the filter criteria 124 may only specify that the requested software is named "software module X." In such an example, the remote server 104 can select the version 1.5.1.3 134d to be returned because the version 1.5.1.3 134d is the most recent among the versions 134a-d as indicated by the major revision value "1" and minor version value "5."

In another example, the software module request 122 can specify an exact version of the software module X to be selected. For example, the filter criteria 124 can specify that the software module's name is "software module X" and the mask is version number "0.9.1.2." In such an example, the filtering module 128 can filter out all of the versions 134b-d because only version 134a exactly matches the filter criteria 124. The remote server 104 then selects the version 0.9.1.2 134a for returning to the computer system 102 because the version 0.9.1.2 134a is the only remaining version.

In the depicted example of FIG. 1, the remote server 104 returns a selected software module 140 to the dependency manager plug-in 112. For example, the remote server 104 can access the central repository 106 to retrieve the selected version of the referenced software module. Additionally, the remote server 104 can identify and retrieve one or more associated debug files for the selected software module. Through a network (e.g., the Internet), the remote server 104 can return the selected software modules 140 and the associated debug files 142 to the dependency manager plug-in 112. In some implementations, multiple files or software modules can be requested using one software module request 122. Additionally, in some implementations, the remote server 104 can return more than one software module to the dependency manager plug-in 112.

In some implementations, after receiving the software module 140 and the associated debug file 142, the dependency manager plug-in 112 can use the file manager 120 to store the software module 140 and the associated debug file 142 in the local storage 108. For example, the file manager 120 can create directories in the local storage 108 in which to store the received software module 140 and the associated debug file 142. In some implementations, the file manager 120 can identify and store the software in an output directory used by the software development application 110 to store executable and other code that is associated with the software project or application currently being developed.

In some examples, the software development application 110 can use the software modules stored in the output directory in the build of the software project. The software modules can be received substantially concurrent with a compilation of a software project using the received software module according to certain implementations.

FIGS. 2 and 5-9 are flow charts of example processes 200, 500, 600, 700, 800, and 900, respectively, for programming and for compiling a computer executable code. The processes 200, 500, 600, 700, 800, and 900 may be performed, for example, by a system such as the software development system 100 and, for clarity of presentation, the description that follows uses the software development system 100 as the basis of an example for describing the processes. However, another system, or combination of systems, may be used to perform the processes 200, 500, 600, 700, 800, and 900.

Figure 2:
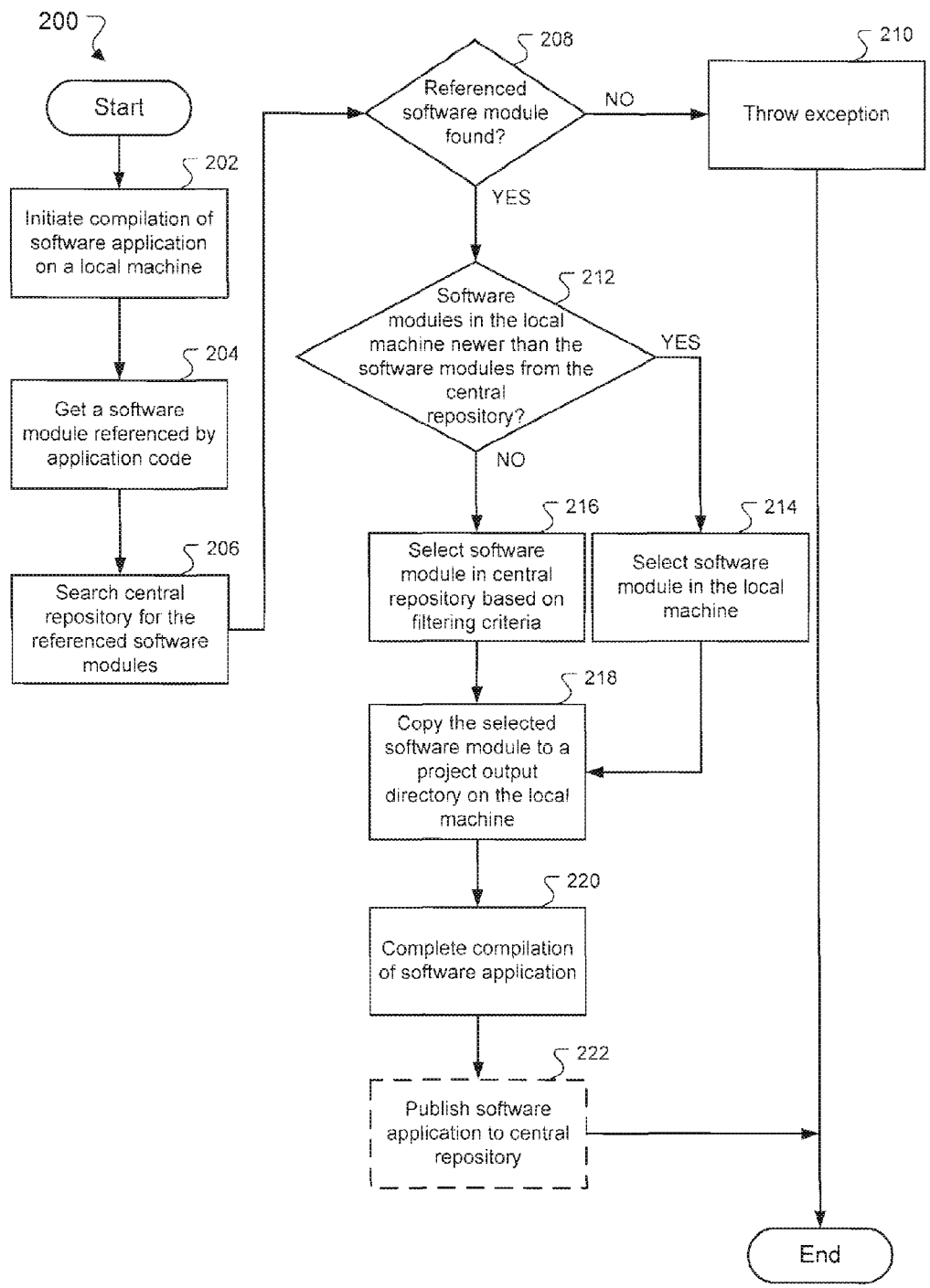
FIG. 2 is a flow diagram illustrating an example process for compiling a software application.

As shown in FIG. 2, the process 200 can be used for compiling a software application. For example, the software application can be developed using the software development application 110. The process 200 begins with initiating compilation of software application on a local machine (202). For example, the software development application 110 can initiate a compilation of application code to generate a software application using the computer system 102.

The process 200 includes retrieving a software module referenced by application code (204). For example, the dependency manager plug-in 112 can parse the application code to obtain identifiers for software modules referenced by the application code. In one implementation, the software development application 110 can store the application code in XML format, and the dependency manager plug-in 112 can parse the XML tags to obtain identifiers for the referenced software modules.

Next, the process 200 includes searching a central repository for the referenced software module (206). For example, the filtering module 128 can access and search the central repository index 126 using the filter criteria 124 associated with the referenced software modules.

The process 200 includes determining whether the referenced software module is found (208). In one example, the filtering module 128 can determine whether the referenced software module is found based on a name of the referenced software module. For example, the filtering module 128 can determine that the referenced software module is not in the central repository 106 if the central repository index 126 does not include any entry having the name of the referenced software module.

If the referenced software module is not found, then the process 200 includes throwing an exception (210) and the process 200 ends. For example, the remote server 104 can transmit an error message to the computer system 102 indicating that the referenced software module is not found.

If the referenced software module is found, then the process 200 proceeds to determine whether software modules stored at the local machine are more recent than the software modules stored at the central repository (212). For example, the dependency manager plug-in 112 can determine whether software modules in the local storage 108 are associated with a more recent version number than the software modules stored at the central repository 106.

The process 200 includes selecting the software module in the local machine (214) if the software module in the local machine is newer than the software modules from the central repository. For example, if dependency manager plug-in 112 determines that software module in the local storage 108 is more recent than the software modules stored in the central repository 106, then the dependency manager plug-in 112 can select the software module in the local storage for compilation of the software application.

The process 200 also includes selecting the software module in the central repository based on filtering criteria (216) if the software module in the local machine is not newer than the software modules from the central repository. For example, the remote server 104 can identify the requested software name using an identifier specified in a request for the software module. Once a particular software module has been selected, the remote server 104 compare the various versions of the identified software module located in the central repository 106 and select, for example, the most recent version.

The process 200 can include copying the selected software module to a project output directory on the local machine (218). For example, the file manager 120 can copy the selected software module to the project output directory after receiving the software module from the central repository 106. In another example, if the software module in the local storage 108 is selected, then the dependency manager plug-in 112 can copy the software module in the local storage 108 to the project output directory.

After copying the selected software modules, the process 200 includes completing the compilation of software application (220). For example, the software development application 110 can complete compilation of the software application if all of the referenced software modules are included in the project output directory.

Next, the process 200 optionally includes publishing the software application to central repository (222) and the process 200 ends. For example, the dependency manager plug-in 212 can publish the newly compiled software application to the central repository 106. In some examples, other developers connected to the remote server 104 can develop software using the newly compiled software application. Some example processes for posting the software modules to the central repository 106 are described with reference to FIG. 8.

By publishing and retrieving software modules from the central repository 106, the software development system 100 can allow software developers to independently work on separate software modules of a software project. Use of the central repository also permits global sharing of the latest version of a particular software module. The version can be uploaded to the central repository and automatically retrieved by the dependency plug-in. Use of the mask enables retrieval of the latest version of a referenced software module even if the specific version of the software module is not referenced in source code being compiled. For example, the source code that references the software module only may require compatibility with the major revision "2" of a software module. Use of the mask allows the most updated version that complies with version "2" (e.g., all minor, patch, and build updates for major revision "2") to be returned by the remote server. Use of the central repository permits new versions that are compatible with the major revision "2" to be automatically retrieved and integrated into the application being compiled as soon as the new versions are uploaded to the central repository.

In some examples, a team of collaborating software developers can use a central repository to share software modules, which are functional but not ready for release in software products. For example, a software developer can compile a software project, which is still under active development, using the system 100, and this project can be published to the central repository 106, so that the developers can access it for testing or other purposes.

Figure 3A:
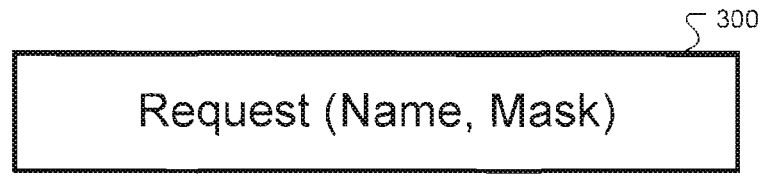
FIGS. 3A-3C are schematic diagrams illustrating examples of syntax for requesting software modules.
Figure 3B:
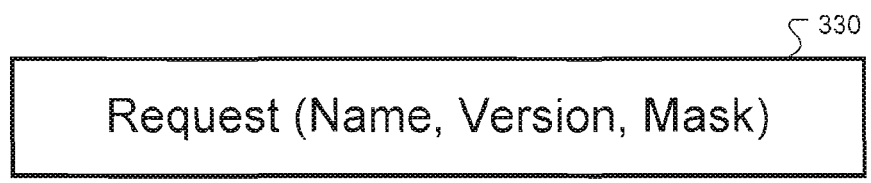
Figure 3C:
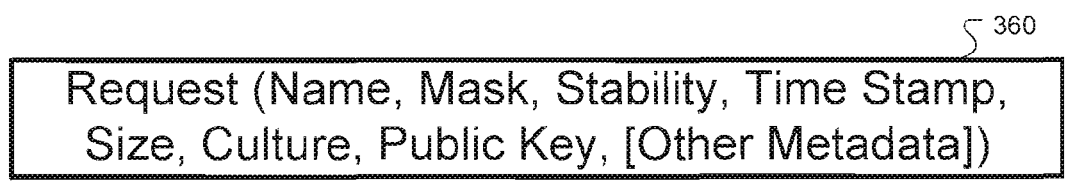

FIGS. 3A-3C are schematic diagrams illustrating example syntaxes of requests 300, 330, 360 for software modules. As shown in FIG. 3A, the syntax of request 300 includes a name and a mask. For example, the name can be a name of the referenced software module. In some implementations, the mask can be specified in a MmPB format, which as discussed above, represents, for example, a major version (M), a minor version (m), a bug fix version (P), and a particular build (B) of the referenced software module. In one example, the syntax of request 300 can partially or entirely specify complete version numbers. The filtering module 128 can filter the software modules, for example, using the specified name and the mask. For example, the mask constructor 116 can generate a request "Request(Socket Library, 3.x.x.x)" to request a latest version of a "Socket Library" module compatible with major version "3."

In some implementations, the mask can be a set of identifiers that are applied to a complete version number to determine what should be masked. As shown in FIG. 3B, the syntax of request 300 includes a name, a version, and a mask. For example, the mask can be a set of identifiers indicating what portion of the complete version number is to be masked out. As an illustrative example, the referenced software module can be a software module Foo.dll, where a reference within an application's source code to Foo.dll is for version 1.0.0.2. In one example, the syntax of the request 330 can specify "Request(name="Foo", Version=1.0.0.2, Mm)." In this example, the identifiers "Mm" mean that the version number is unspecified except for the major and minor version numbers. In some implementations, the remote server 104 can return a latest published software module that matches the specified of Major.minor version. For example, the remote server 104 may return "Foo.dll" with version=1.0.2.79 (e.g., 1.0.2.79 may be the latest version published for this software module).

As shown in FIG. 3C, the syntax of request 360 includes fields for specifying other filtering criteria. The syntax 360 specifies a name, a mask, a stability indicator, a time stamp, a size, a culture, a public key, and other metadata of the referenced software module. Each of the parameters included in the syntax can also remain partially or completely unspecified. For example, the time stamp may indicate that a version on a particular day be returned, but the particular hour may not be specified.

FIG. 4 is a schematic diagram illustrating an example index 400 used to identify software modules. In some implementations, the central repository index 126 can be formatted in a similar fashion to the format of the index 400. In the depicted example, the index 400 includes columns that include software module name 402, location 404, major revision 406, minor revision 408, patch 410, build 412, stability indicator 414, time stamp 416, size 418, culture 420, public key 422, and other metadata 424.

As shown, the index 400 includes entries 430a-d, 440a-c, 450a-b of various software modules. For example, the entries 430a-d identify computer executable codes stored in the central repository 106. For example, the entries 440a-c identify sets of test data, and the entries 450a-b identify images stored in the central repository 106.

In the depicted example, the software module name column 402 specifies a name of the software module related to each of the entry. The location column 404 specifies a location in which the software module of the entry can be retrieved from the central repository 106. The major revision, minor revision, patch, and build columns 406, 408, 410, 412 each specify values used in a version number of each of the software modules. The stability indicator 414 indicates a status of executable codes stored in the central repository 106.

For example, executable code can be pending, stable, or rejected. Executable code having a "pending" status may indicate that the associated code is still being evaluated (e.g., it is being tested to ensure it does not have errors). Executable code having a "stable" status may indicate that the associated code has passed a testing process and is ready for release. Executable code having a "rejected" status may indicate that the associated code has failed one or more aspects of a test, but may have some working functionality.

A size column 418 indicates the size of the software module represented by each entry. A culture column 420 indicates whether a software module is developed specifically for a particular culture. For example, a software module may include text, which is displayed. A "culture" value, associated with the United States (represented by US in the column 420) and Germany (represented by DE in the column 420) identifies a particular culture for which the software module is appropriate. In some examples, a software module can also be culturally neutral (e.g., the software module does not have a user interface aspect), as indicated by the "*" in the column 420.

The public key 422 column can include or indicate a public key for each of the software modules. For example, the public key can be used as a signature for the software module indicating that it has remained unchanged since being uploaded to the central repository. The software development application 110 can use the signature to validate that the software module remains unchanged before retrieving it for integration with a software project being compiled.

The other metadata column 424 can include other metadata about the software module version represented by each of the index entries. In the depicted example, the entry 430c includes a comment ("Failed Test E") that specifies a reason software module version was rejected. Other metadata can also be included in the other metadata column 424.

In some implementations, the filtering module 128 can use the index 400 in filtering software modules according to the filter criteria 122. For example, the filtering module 128 can filter versions of the software modules based on the filter criteria included in the requests 300, 330, and/or 360. For example, the filtering module 128 may receive a request "Request(Socket Library, 3.x.x.x)." In such an example, the filtering module 128 can use the index 400 to filter software modules using the name and the mask specified by the received request. In the depicted example, four versions of a software module named "socket library" are stored in the central repository 106 as shown by the entries 430a-d. Within the entries 430a-d, the filtering module 128 can select the entries 430c-d using the mask "3.x.x.x" because the entries 430c-d are compatible with major version of "3," while the versions associated with the entries 430a-b are not.

After filtering based on the mask, the remote server 104 can select one of the remaining versions to return to the dependency manager plug-in. In some implementations, the remote server 104 selects the version to return based on one or more predetermined rules. In one example, the remote server 104 can include a rule to select a most recent version from the remaining versions after filtering. Using the above example, the remote server 104 may select the version 3.4.1.5 (associated with the entry 430c) to return to the client device because it is the latest version. In another example, the remote server 104 can include a rule to select a stable version from the remaining versions after filtering. For example, the remote server 104 can compare the stability indicator 414 of the remaining entries and select an entry with a "pending" stability indicator. Using the above example, the remote server 104 may select the version 3.3.6.2 (the entry 430d) because the entry 430d has a "pending" stability indicator.

In some implementations, more complex rules can be used to select the software modules. For example, the remote server 104 can select the most recent version that also has a stability indicator (e.g., stable is preferred over pending, which is preferred over rejected).

For example, the remote server 104 can receive a request "Request(Socket Library, 2.1.1.0, Mm)." Based on the received request, in some implementations, the remote server 104 can, first, filter the entries 430a-d using the mask to filter out versions without the major.minor version "2.1." Secondly, the remote server can select one of the remaining versions based on the predetermined rules. In some examples, a rule can specify that the remote server 104 first selects a "stable" version from the remaining versions. If there is more than one stable version, then the remote server 104 selects a most recent version of the software modules that are listed as stable. For example, the remote server 104 may select the version 2.1.0.1 430b in this example.

In some implementations, the computer system 102 can use the request 360 to specify the mask and other filtering criteria. As an illustrative example, the computer system 102 can transmit a request "Request(Socket Library, 3.x.x.x, rejected, x, x, US, A2E, "Failing Test E")" to the remote server 104. Based on the information specified in the request, the remote server 104 can filter and select the entry 430c.

The requests 300, 330, 360 can also be used to query for other file types, such as data files or media files, from the central repository 106. In one example, the computer system 102 can request the Cursor Wait Image by transmitting "Request(Cursor Wait Image, 2.x.x.x)" to the remote server 104. In this example, the remote server 104 can return the software module represented by the image represented by the entry 450b to the computer system 102 because the image associated with the entry 450b is more recent (e.g., it has a major version "2" while the image associated with the entry 450a has a version "1").

In another example, the computer system 102 can request a test data file (e.g., a file containing, in ASCII format, test inputs and expected outputs to an executable software module) by transmitting "Request(Socket Test Data, 3.x.x.x, NA, *, *, DE, QDE)" to the remote server 104. In response, the remote server 104 can return the software module represented by the entry 440b to the computer system 102 because the test data associated with the entry 440b more accurately matches the request (e.g., it has a culture value of "DE" while the test data associated with the entry 440a has a culture value of "US").

Figure 5:
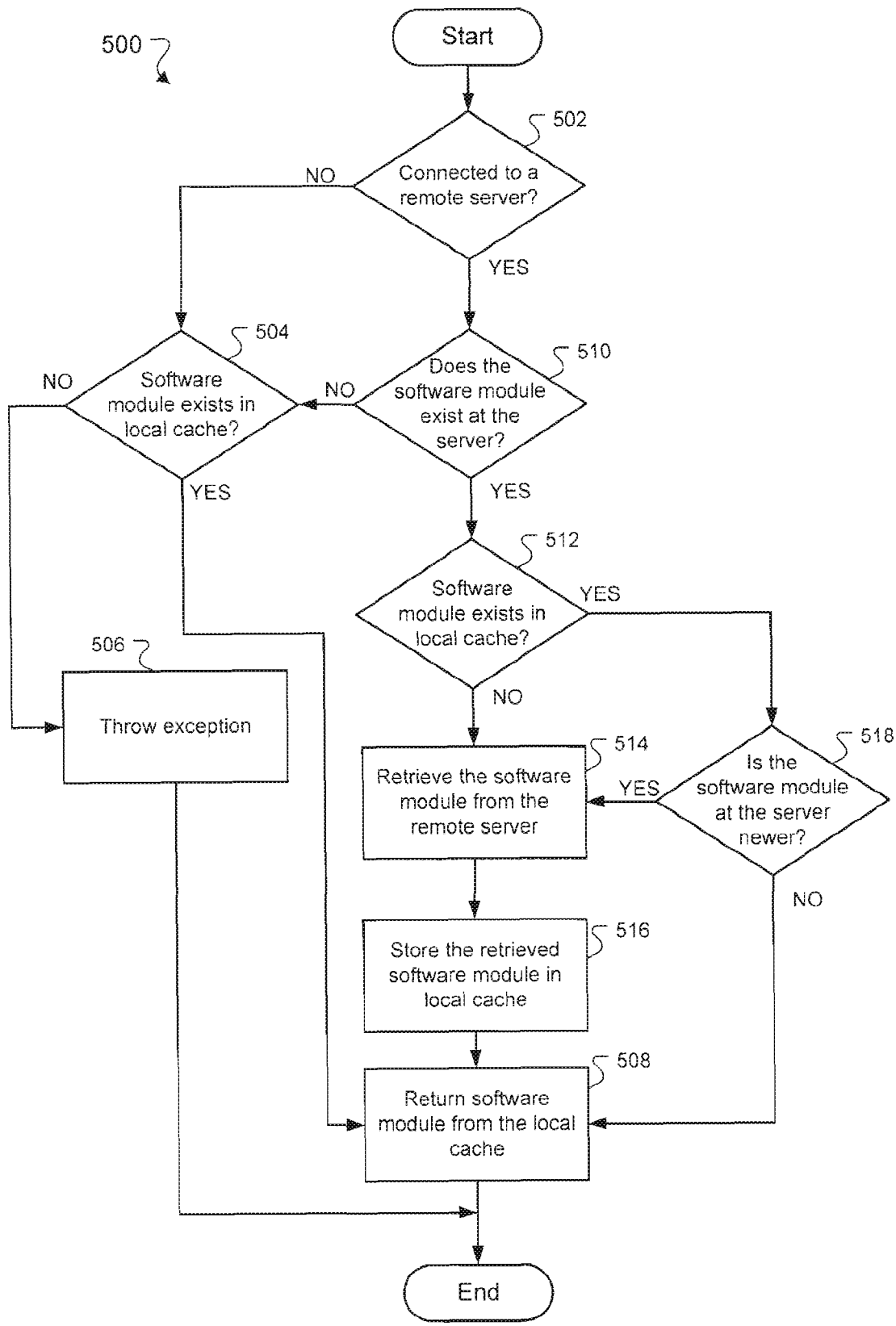
FIG. 5 is a flow diagram illustrating an example process for querying a local and remote cache for a software module.

FIG. 5 is a flow diagram illustrating an example process 500 for querying a local cache and remote repository for a software module. For example, the process 500 may be performed by the dependency manager plug-in 112. The process 500 begins with determining whether a system performing the process 500 is connected to a remote server (502). For example, the dependency manager plug-in 112 can determine whether the computer system 102 is connected to the remote server 104.

If the performing system is not connected to the remote server, then the process 500 includes determining whether a requested software module exists in a local cache (504). For example, the dependency manager plug-in 112 can access the local storage 108 to determine whether the requested software module exists in the local storage 108.

If the software module does not exist in a local cache, then the process 500 includes throwing an exception (506) and the process 500 ends. For example, the dependency manager plug-in 112 can indicate the software module is unavailable, and the software development application 110 can throw an exception indicating an error.

If the software module exists in a local cache, then the process 500 returns the software module from the local cache (508) and the process 500 ends. For example, the dependency manager plug-in 112 can return a storage location of the software module(s) in the local storage 108.

At step 502, if the system is connected to the remote server, then the process 500 includes determining whether the software module exists at the server (510). For example, the dependency manager plug-in 112 can query the remote server 104 to determine whether the software module is stored in the central repository 106.

If the software module is not stored in the central repository 106, then the operation at step 504 is performed as discussed above. In contrast, if the software module is stored in the central repository 106, then the process 500 also proceeds to determine whether the software module exists in the local cache (512). For example, the dependency manager plug-in 112 can access the local storage 108 to determine whether the requested software module exists in the local storage 108.

If the software module does not exist in the local cache, then the process 500 includes retrieving the software module from the remote server (514). For example, the dependency manager plug-in 112 can transmit a request for the software module from the central repository 106.

Next, the process 500 includes storing the retrieved software module in a local cache (516) and the operation at step 508 is performed as discussed above. For example, the dependency manager plug-in 112 can store the retrieved software module in the local storage 108 and return the location of the software module in the local storage 108.

At step 512, if the software module exists in the local cache, then the process 500 includes determining whether the software module at the server is newer than the software module stored in the local cache (518). For example, the dependency manager plug-in 112 can compare version numbers or time stamps of the software modules in the central repository 106 and in the local storage 108.

If the software module at the server is newer, then the operation at step 514 is performed as discussed above. If the software module at the server is not newer, then the operation at step 508 is performed as discussed above.

Figure 6:
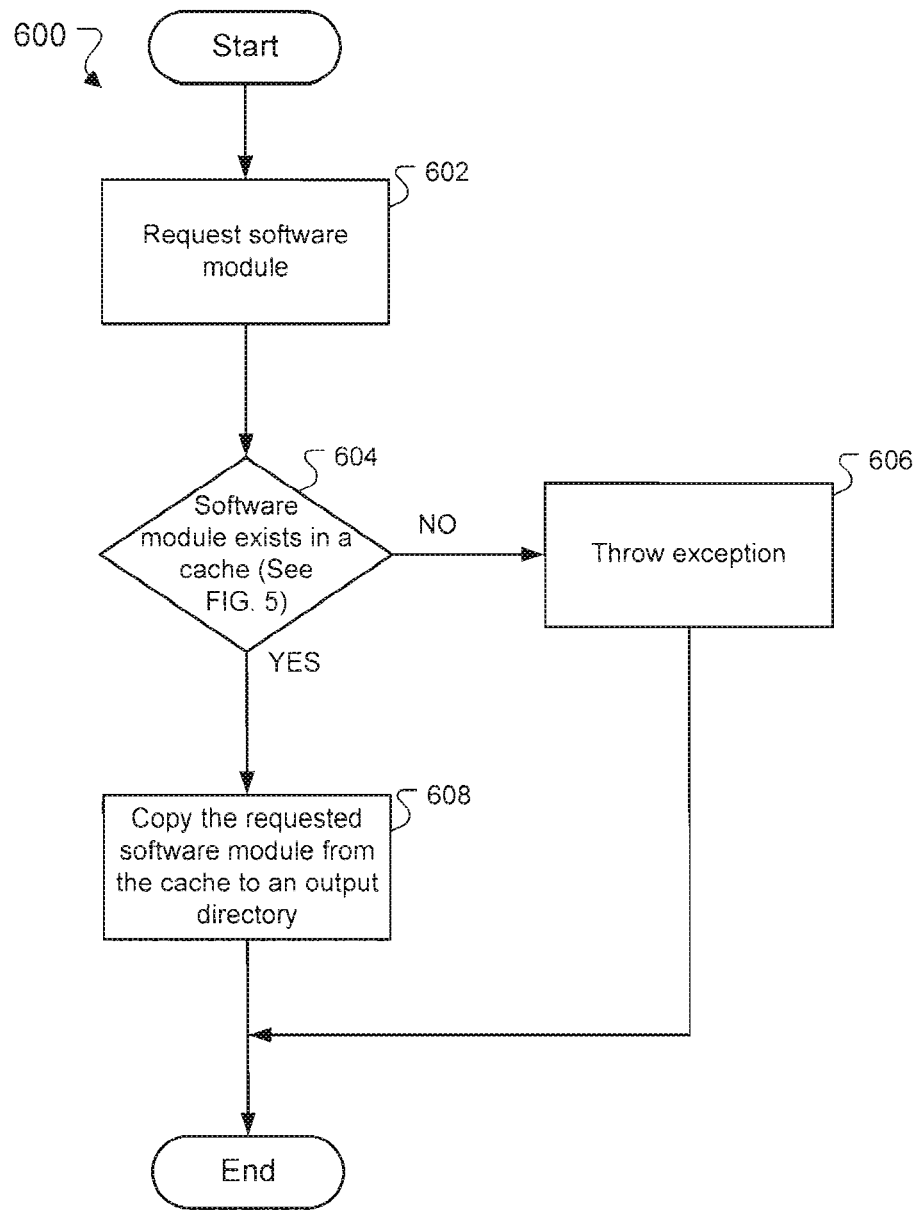
FIG. 6 is a flow diagram illustrating an example process for requesting a software module from a local storage location.

FIG. 6 is a flow diagram illustrating an example process 600 for requesting a software module from a local storage location. For example, the software development application 110 can use the process 600 to request one or more software modules from the local storage 108.

The process 600 begins with requesting a software module (602). For example, the software development application 110 can request a software module using the dependency manager plug-in 112, during compilation of a software project.

Next, the process 600 determines whether the software module exists in a local cache (604). For example, the dependency manager plug-in 112 can perform the process 500 (See FIG. 5) to determine whether the software module exists in the cache either before or after the remote server 104 is queried.

If the software module does not exist in the cache, then the process 600 can throw an exception (606), and the process 600 ends. For example, the software development application 110 can throw an exception to indicate that the software module is not in the local storage 108.

If the software module exists in the cache, at step 608, the requested software module is copied from the cache to an output directory, and the process 600 ends. For example, the software development application 110 can copy the software module from a current location in the local storage 108 to an output directory of the software project (e.g., a bin directory of the software project).

Figure 7:
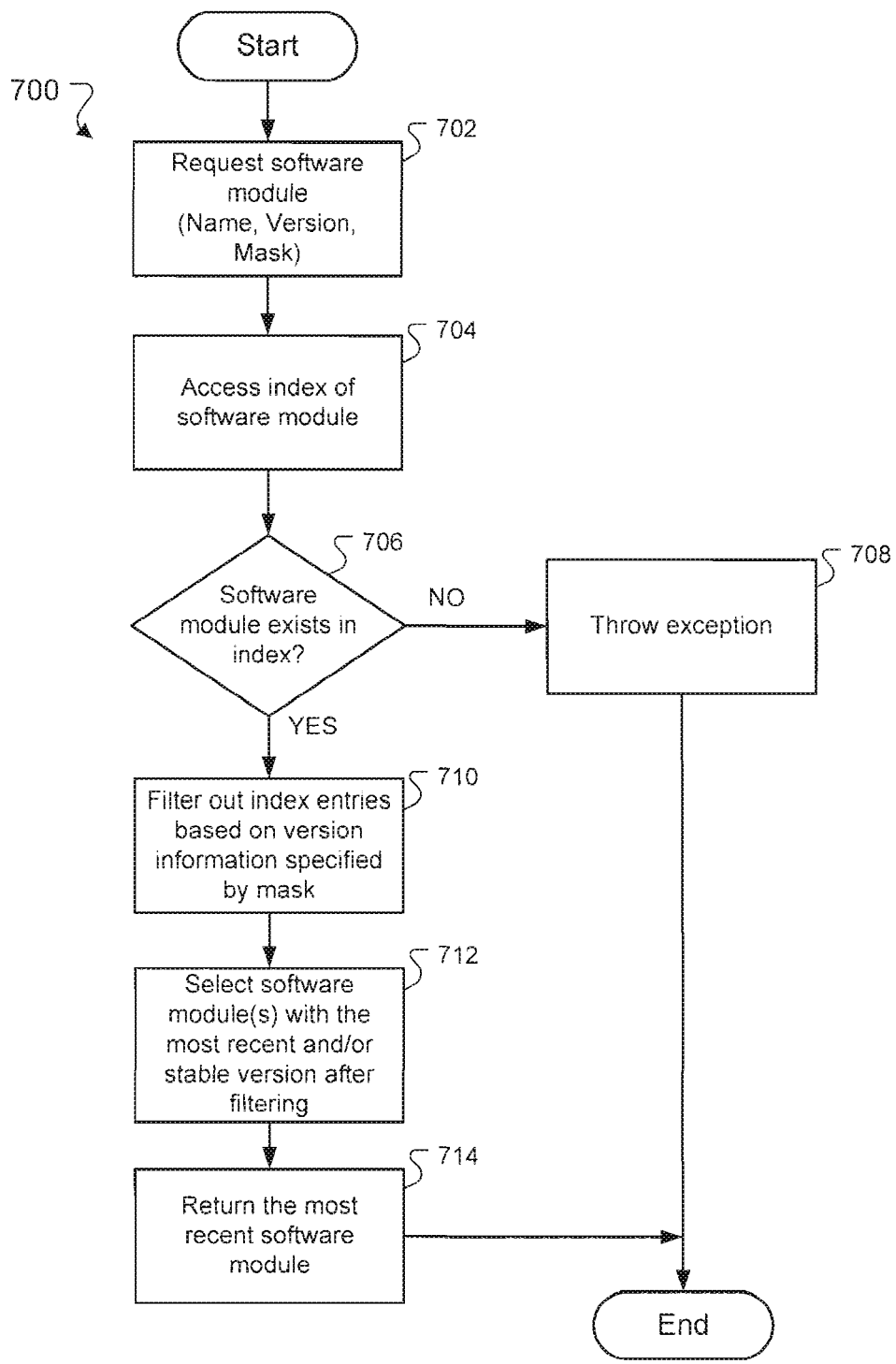
FIG. 7 is a flow diagram illustrating an example process for retrieving a software module from a repository.

FIG. 7 is a flow diagram illustrating an example process 700 for retrieving a software module from a repository. For example, the dependency manager plug-in 112 can use the process 700 to retrieve software modules from the central repository 106. Using the process 700, the dependency manager plug-in 112 can retrieve referenced software modules based on a software module request (e.g., the software module request 122).

The process 700 begins with requesting a software module (702). For example, the dependency manager plug-in 112 can request a software module by transmitting a request (e.g., a request using one of the syntax formats 300, 330, or 360) to the remote server 104. In one implementation, the request can include a name, a version, and a mask of the requested software module.

Next, the process 700 includes accessing an index of software modules (704). For example, the dependency manager plug-in 112 can access the central repository index 126.

After accessing the index, the process 700 includes determining whether the software module exists in the index (706). For example, the dependency manager plug-in 112 can search the central repository index 126 for an index entry with a name matching the software module name.

If the software module does not exist in the index, then the process 700 includes throwing an exception (708) and the process 700 ends. For example, the dependency manager plug-in 112 can throw an exception to indicate that the software module is not found in the central repository 106.

If the software module exists in the index, then the process 700 performs step 710, which involves filtering out entries based on version information specified by the mask. For example, the filtering module 128 can filter the versions represented by the entries 430a-d of the socket library using a mask specified by one of the syntax formats 300, 330, 360.

Next, the process 700 includes selecting one or more software modules with the most recent and/or stable version after filtering (712). For example, the dependency manager plug-in 112 can select (or instruct the remote server 104 to select), after filtering, the remaining versions according to one or more predetermined rules. In one example, the dependency manager plug-in 112 can select the most recent version among the remaining versions after filtering. In another example, the dependency manager plug-in 112 can select one or more of the stable versions among the remaining versions after filtering.

After selecting the software module, the process 700 includes returning the most recent software module (714) and the process 700 ends. For example, the dependency manager plug-in 112 can return a local storage location of the most recent software module (e.g., according to version number or time stamp of the one or more selected software modules) to the software development application 110.

Figure 8:
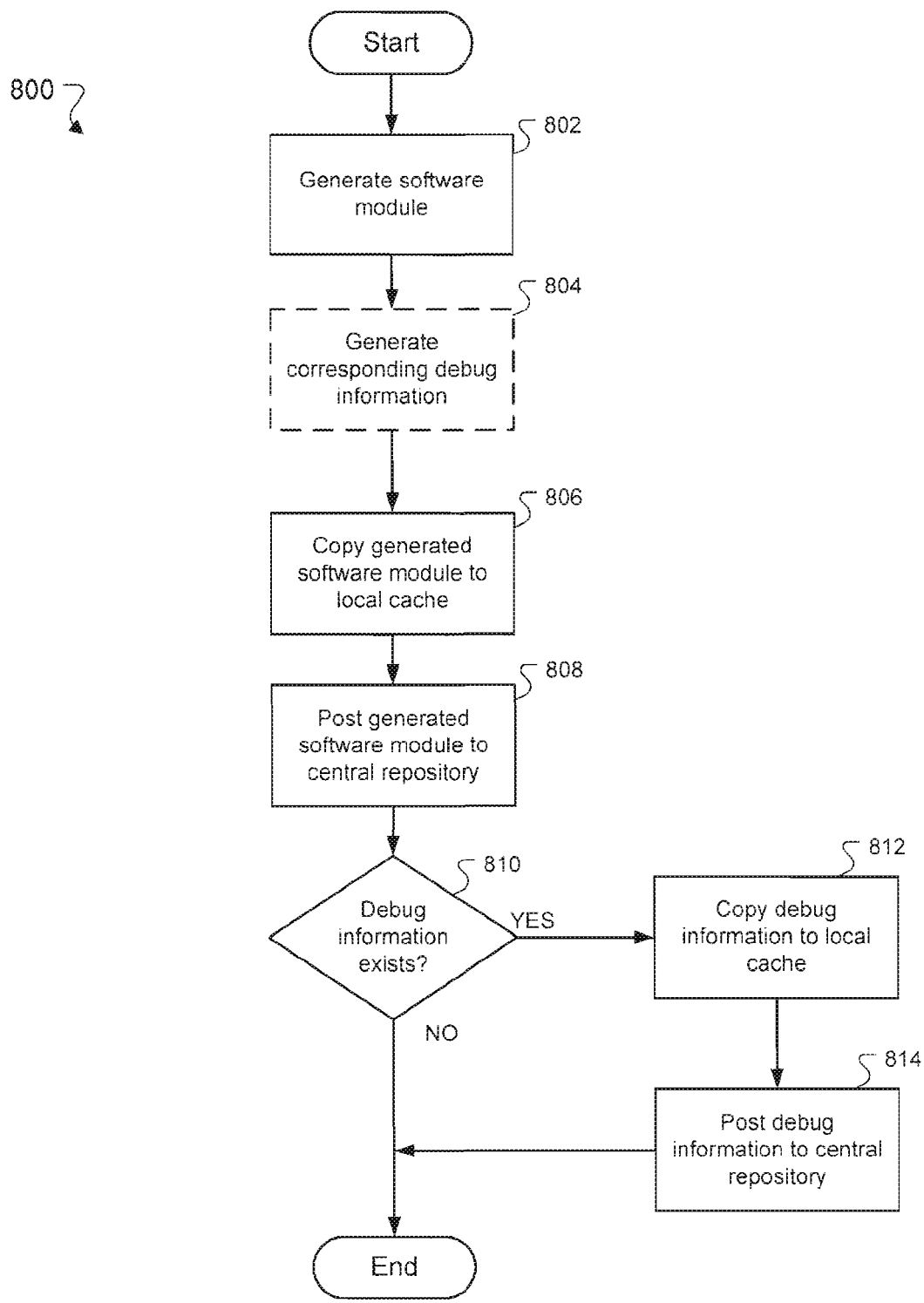
FIG. 8 is a flow diagram illustrating an example process for publishing a software module to a repository.

FIG. 8 is a flow diagram illustrating an example process 800 for publishing a software module to a repository. For example, the computer system 102 can perform the process 800 to publish a new version of a software module to the central repository 106.

The process 800 begins with generating a software module (802). For example, the computer system 102 can generate the software module using the software development application 110.

The process 800 optionally includes generating corresponding debug information (804). For example, the debug information can be a file used to verify functionalities of the software module. In one example, a user can use the software development application 110 to generate the debug information (e.g., the debug files 132).

Next, the process 800 includes copying the generated software module to a local cache (806). For example, the software development application 110 can copy the generated software module to the local storage 108.

The process 800 includes posting the generated software module to a central repository (808). For example, the computer system 102 can post the generated software module to the central repository 106. In some implementations, the remote server 104 can update the central repository index 126 after receiving the generated software module in the central repository 106.

In some implementations, the remote server 104 can validate the received software module before posting in the central repository 106. For example, the remote server 104 can compare one or more method or variable signatures in the generated software module to corresponding method or variable signatures of previously stored versions in the central repository 106 to determine whether a user should be permitted to upload the software module.

For example, the remote server 104 can determine a number of parameters required by a method and use this as a method signature for that method. The remote server 104 can compare the method signatures between a software module being uploaded to the central repository and the previous versions stored in the central repository. Similarly, the remote server 104 can In another example, the remote server 104 can determine data types and a number of variables, and use this information as a variable signature for a software module. The remote server can also use the variable signature to validate whether a software module is compatible with previous versions (and, consequently, whether the new software module should be stored in the central repository).

In some implementations, the remote server 104 is configured to determine whether the generated software module is backward compatible based on the comparison. For example, the remote server 104 may determine that the generated software module is backward compatible if the generated software module satisfies one or more test conditions. One test condition may be that the generated software module must include all methods included in the previously stored versions. Another test condition may require that a new software module may have different method signatures than previously uploaded versions, but that the methods must only contain additional, optional parameters so that the method is backward compatible with previous versions.

In some implementations, the remote server 104 can determine a variance of the determined software modules and previously stored versions of the software module in the central repository. For example, the variance can be generated based on the comparison of the method or variable signatures between the generated software module and the previous versions of the software module. In some examples, the remote server 104 can prevent the generated software module from being stored in the central repository 106 if the variance exceeds a threshold variance. For example, the remote server 104 can prevent the generated software module from being stored in the central repository 106 if the number of parameters of a method decreases in the generated software module. In another example, the remote server 104 can prevent the generated software module from being stored in the central repository 106 if the generated software module adds one or more required parameters to the method.

After posting the generated software module, in step 810, it is determined whether debug information exists. For example, the software development application 110 can check whether debug files are generated by the compilation of the software project.

If the debug information does not exist, then the process 800 ends. If the debug information exists, then the process 800 performs step 812, which includes copying the debug information to a local cache (812). For example, the software development application 110 can copy the debug information to the local storage 108.

Next, the process 800 includes posting debug information to the central repository (814). For example, the software development application 110 can post the debug information to the central repository 106.

Figure 9:
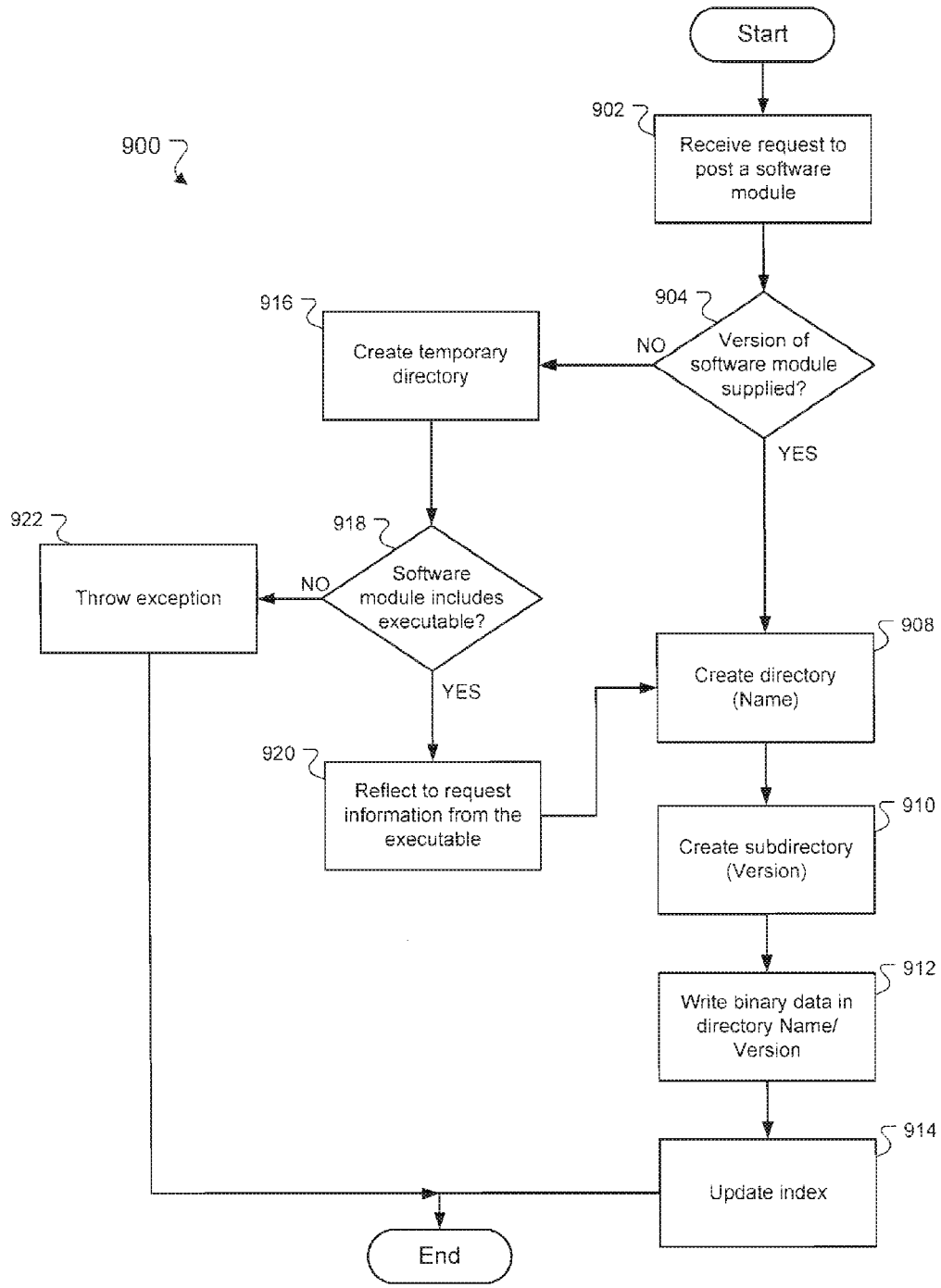
FIG. 9 is a flow diagram illustrating an example process for storing a software module in a repository.

FIG. 9 is a flow diagram illustrating an example process 900 for storing a software module in a repository. For example, the remote server 104 can use the process 900 to store the software modules 130 in the central repository 106.

The process 900 begins with receiving a request to post a software module (902). For example, the remote server 104 can receive a request to post a software module from the computer system 102.

Next, the process 900 includes determining whether a version of the software module is supplied (904). For example, the remote server 104 can check, in the software module post request, whether a designated version number of the software module (or other metadata included in the index) is indicated.

Next, the process 900 includes creating a directory (908). For example, the remote server 104 can create a directory—having the name of the software module—in the central repository 106 if such a directory does not exist.

Next, the process 900 includes creating a subdirectory (910). For example, the remote server 104 can create a directory—having a name related to the version information—as a subdirectory under the directory with the software module name.

After creating the subdirectory, the process 900 performs step 912, in which the software module is written to the created subdirectory.

Next, the process 900 performs step 914, in which the index is updated, and the process 900 ends. For example, the remote server 104 can update the central repository index 126 to include the following information (e.g., storing location, version number, stability indicator, etc.) of the software module.

At step 904, if the version of the software module is not supplied, the process 900 includes creating a temporary directory (916). For example, the remote server 104 can create a temporary directory in the central repository 106.

Next, the process 900 includes determining whether the software module includes executable code (918). For example, the remote server 104 can check a file extension of the software module to determine whether the software module includes one or more executable files.

If the software module is an executable file, then the process 900 includes "reflecting" to request version information (and possibly other metadata) from the executable file (920). For example, the file may have a method (e.g., the Java language's "reflect" method), which when called returns version information. After reflecting and returning version information, the operation at step 908 is performed.

If the software module is not executable as determined in step 918, then the process 900 may throw an exception (922) and the process 900 ends. For example, the remote server 104 can display an exception to a user at the computer system 102 to indicate that a version number is required to post the software module.

In some implementations, the remote server 104 can include other reflection processes to obtain version information for software modules that are not executable files. In one example, the remote server 104 can search the first "n" line (e.g., the first 5 lines) of a non-executable file to obtain version information that, for example, is proceeded by a predetermined identifier such as "<version>."

Figure 10:
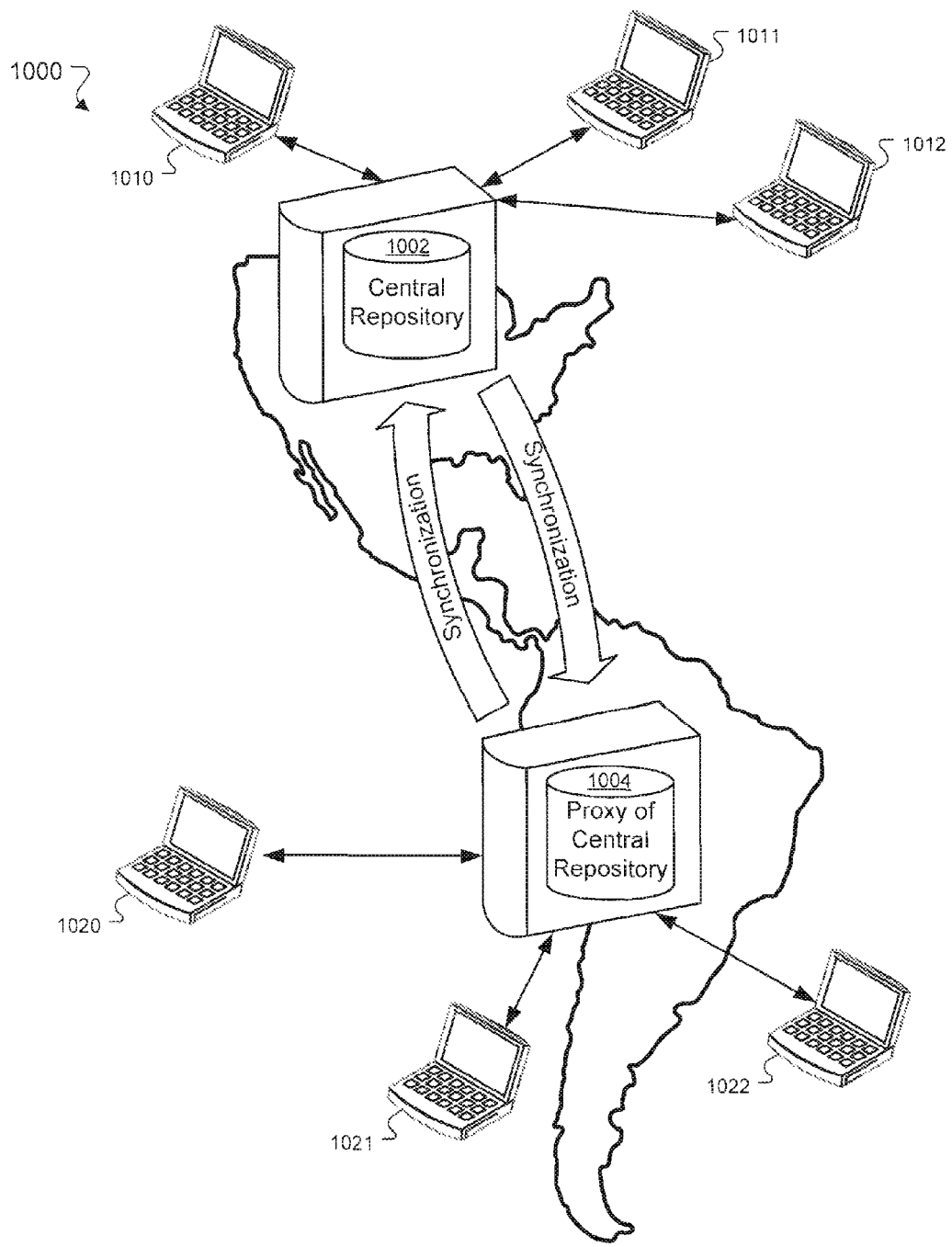
FIG. 10 is a schematic diagram illustrating an example system having more than one repository.

FIG. 10 is a schematic diagram illustrating an example system 1000 having more than one repository. In the depicted example, the system 1000 includes two repositories 1002, 1004. The repository 1004 is a local proxy repository of the central repository 1002. In some examples, the repositories 1002, 1004 can store software modules for building a software application.

In the depicted example, the central repository 1002 is located in North America, and the proxy repository 1004 is located in South America. The system 1000 includes client computer systems 1010, 1011, 1012 in North America. The computer systems 1010-1012 are configured to access the central repository 1002. The system 1000 also includes client computer systems 1020, 1021, 1022 in South America, which are configured to access the proxy repository 1004.

The repositories 1002, 1004 can synchronize their content. In some implementations, the repositories 1002, 1004 are configured to synchronize with each other periodically (e.g., every 24 hours). By synchronizing the content of the repositories 1002, 1004, both repositories 1002, 1004 store the same software modules regardless of whether the software module originated from client computer systems in, for example, North or South America. In some implementations, the system 1000 can improve the speed of which the client computer systems 1010-1012 and 1020-1022 can access their respective repositories. For example, the client computer systems 1010-1012 and 1020-1022 can compile software projects by retrieving software modules from their local repository, instead of waiting for a remote repository to return a requested software module.

In some implementations, the computer systems 1010-1012 and 1020-1022 can specify which repository to access. For example, the computer systems 1010-1012 and 1020-1022 can dynamically select one of the repositories 1002, 1004 based on the latency time of each repository.

Although a few implementations have been described in detail above, other modifications are possible. For example, the central repository 106 can include more than one repository. In some implementations, the remote server 104 can be a network of computer systems. In some examples, the central repository 106 can include memory space on each of the computer systems in the network.

In certain implementations, the remote server 104 can include a web service front end and a database backend. The web service front end can provide uniform access methods to the central repository index 126. The database backend can provide a database structure for storing and management of the software modules 130. In using the web service front end and the database backend, the remote server 104 may, for example, serve a large-scale software development system (e.g., a software development system with several developers simultaneously accessing the remote server) more efficiently.

In some implementations, the filtering module 128 can be implemented in the computer system 102 instead of in the remote server 104. For example, a dependency manager plug-in can include the filtering module 128 to access the central repository index 126. By remotely accessing the central repository index 126, the filtering module 128 can filter the versions of the software modules locally at the computer system 102. After filtering, the dependency manager plug-in can select, among the remaining software module versions, a software module to be retrieved from the central repository 106. For example, the dependency manager plug-in can remotely select the software module version. By specifying a remote location (e.g., an internet protocol (IP) address) specified in the central repository index 126, the dependency manager plug-in can remotely retrieve the selected software module.

In certain implementations, an independent software application, instead of a plug-in, can be implemented to perform the functions of the dependency manager plug-in 112 described herein. For example, a dependency manager software application can cooperate with the software development application 110 to build software projects by retrieving required software modules from the central repository 106.

In some implementations, the software development application can include a user interface (e.g., a graphical user interface (GUI)) to configured one or more functionalities of the dependency manager plug-in 112. In some implementations, a user can use the user interface to enable, or disable one or more functionalities of the dependency manager plug-in 112. For example, the user can use the user interface to disable the dependency manager plug-in 112 from accessing the remote server 104, forcing the compilation of the software project to use local copies of the software modules. In another example, the user can use the user interface to disable the dependency manager plug-in 112 from posting generated software modules.

In some implementations, the user interface can be used to alternate one or more functionalities of the dependency manager plug-in 112. In one example, a user can use the user interface to define or to select the software module selection rules used by the remote server 104. In another example, the user interface can be configured to allow the user to select whether a software module is to be automatically or manually posted to the central repository 106 after each build.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A process of programming and compiling computer-executable code, the process comprising:
   receiving a new or modified version of a software module;
   publishing the new or modified version of the software module to a central repository to permit access of the software module version by a plurality of clients;
   receiving, during a computer programming process for a software program, a specification of a software module having a defined functionality for use by the software program, wherein the software module is stored in the central repository, the central repository storing different published versions of the software module;
   compiling the software program, compilation initiating steps comprising
      querying the central repository to identify a plurality of versions of the software module and filtering versions of the software module that do not meet the specification, wherein the specification corresponds to more than one version of the software module;
      selecting, from versions that have not been filtered out, a selected version of the software module, wherein selection is based on one or more predetermined rules that compare the versions that have not been filtered out; and
   returning the selected version of the software module from the central repository for local storage with the software program.

2. The process of claim 1, wherein the software module comprises executable instructions.

3. The process of claim 1, wherein the software module comprises data.

4. The process of claim 1, wherein each of the one or more versions differ functionally from each other.

5. The process of claim 1, wherein the specification of the software module comprises an identifier that specifies a major revision of the software module, an identifier that specifies a minor revision of the software module, an identifier that specifies a bug fix revision for the software module, an identifier that specifies a particular build of the software module, or a combination thereof 6. The process of claim 5, wherein filtering versions of the software module that do not meet the specification comprises comparing one or more of the identifiers to entries in an index that specify the different versions.

7. The process of claim 6, wherein the filtering further comprises removing from consideration one or more versions of the requested software module that do not correspond to criteria expressed by the one or more identifiers.

8. The process of claim 1, wherein the selection based upon one or more predetermined rules comprises selecting a most recent version from the versions that have not been filtered out.

9. The process of claim 1, wherein the selection based upon one or more predetermined rules comprises selecting a most recent and stable version from the versions that have not been filtered out.

10. The process of claim 1, wherein the central repository is stored remotely on a server.

11. The process of claim 10, wherein the steps initiated by the compilation further comprise requesting, by a client that stores the software program, the software module from the server.

12. The process of claim 1, wherein the receipt of the specification of the software module and the returning of the selected version of the software module is performed by a software plug-in to a software development application used in the programming process.

13. The process of claim 12, further comprising providing a user interface configured to disable the plug-in's functionality.

14. The process of claim 1, further comprising synchronizing the central repository with a second central repository having versions of the software module.

15. The process of claim 14, wherein the central repository serves as a local proxy repository for the second central repository.

16. The process of claim 1, wherein the central repository comprises multiple repositories.

17. The process of claim 1, further comprising checking a local cache for the software module before requesting the software module from the central repository.

18. The process of claim 1, further comprising validating new versions of the software module before the new versions are stored in the central repository.

19. The process of claim 18, wherein validating the new versions comprises comparing one or more method or variable signatures to corresponding method or variable signatures of versions previously stored in the central repository.

20. The process of claim 19, wherein validating the new versions comprises preventing a new version from being stored in the central repository if the one or more method or variable signatures of the new version exceed a threshold variance when compared to the corresponding method or variable signatures of versions previously stored in the central repository.

21. The process of claim 1, further comprising selecting a corresponding debug file that is associated with the selected version of the software module and returning the debug file with the selected version.

22. A computer-implemented process of returning, during a compilation process, a shared artifact for use by a software program, the process comprising:
    receiving a new or modified version of a shared artifact;
    publishing the new or modified version of the shared artifact to a central repository to permit access of the shared artifact version by a plurality of clients;
    receiving a request for the shared artifact for use by a software program, the request comprising one or more parameters that partially specify the shared artifact;
    accessing the central repository that stores different published versions of the shared artifact that are available for use;
    querying the central repository to identify a plurality of versions of the shared artifact;
    selecting a selected version of the shared artifact, selection comprising
        excluding versions of the shared artifact that do not meet the partial specification provided by the one or more parameters;
        selecting, from versions of the shared artifact that have not been excluded, the selected version of the shared artifact based on one or more predetermined rules that compare the versions that have not been excluded; and
    returning, from the central repository, the selected version of the shared artifact for local storage with the software program.

23. The process of claim 22, wherein outputting the selected version of the shared artifact occurs during a period substantially concurrent with compilation of the software program.

24. The process of claim 22, wherein the version of the shared artifact is available for selection when the version of the shared artifact is stored in the central repository.

25. A computer program product tangibly embodied in an information carrier, the computer program product including instructions that, when executed, perform operations for selecting and returning a software module for use by a program, the operations comprising:
    receiving a new or modified version of a shared artifact;
    publishing the new or modified version of the shared artifact to a central repository to permit access of the shared artifact version by a plurality of clients;
    receiving a request for the shared artifact for use by a software program, the request comprising one or more parameters that partially specify the shared artifact;
    accessing the central repository that stores different published versions of the shared artifact that are available for use;
    querying the central repository to identify a plurality of versions of the shared artifact;
    selecting a selected version of the shared artifact, the selection comprising
        excluding versions of the shared artifact that do not meet the partial specification provided by the one or more parameters;
        selecting, from versions of the shared artifact that have not been excluded, the selected version of the shared artifact based on one or more predetermined rules that compare the versions that have not been excluded; and returning, from the central repository, the selected version of the shared artifact for local storage with the software program.

* * * * *

UNITED STATES PATENT AND TRADEMARK OFFICE
CERTIFICATE OF CORRECTION

PATENT NO. : 8,464,228 B2  
APPLICATION NO. : 11/844143  
DATED : June 11, 2013  
INVENTOR(S) : Craig Campbell Page 1 of 1

It is certified that error appears in the above-identified patent and that said Letters Patent is hereby corrected as shown below:

In the Claims:

In Claim 5, column 17, line 13, delete "thereof" and insert -- thereof. --, therefor.

Signed and Sealed this
Seventeenth Day of September, 2013

Teresa Stanek Rea
*Deputy Director of the United States Patent and Trademark Office*